(No Model.) 2 Sheets—Sheet 1.

G. W. LOW & W. SHAKESPEARE, Jr.
PHOTOGRAPHIC SHUTTER.

No. 471,675. Patented Mar. 29, 1892.

WITNESSES:

INVENTORS:
Garrett W. Low and
William Shakespeare Jr.
BY Phillips Abbott
their ATTORNEY (No Model.) 2 Sheets—Sheet 2.
G. W. LOW & W. SHAKESPEARE, Jr.
PHOTOGRAPHIC SHUTTER.
No. 471,675. Patented Mar. 29, 1892.
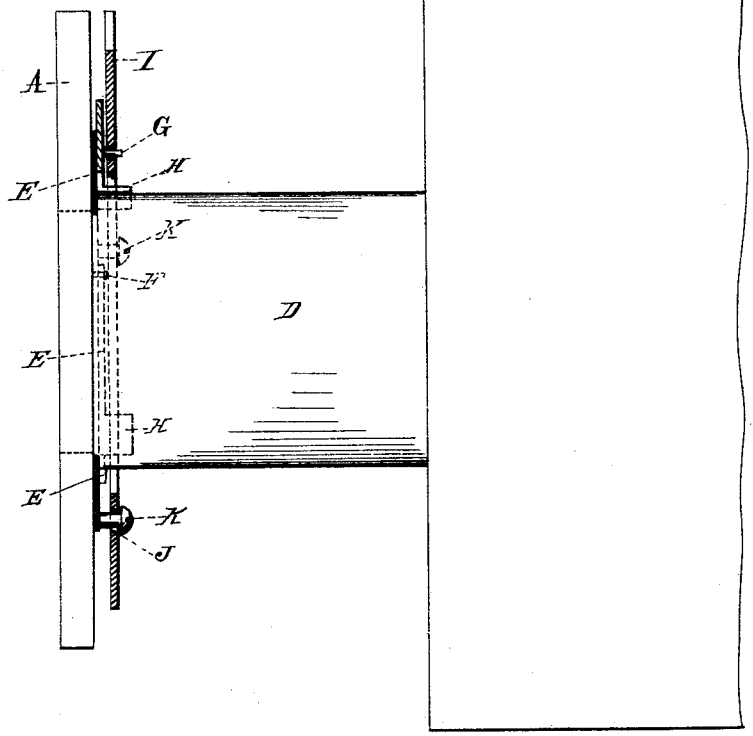
WITNESSES:
INVENTORS:
Geo W Low & Wm Shakespeare
BY Phillips Abbott
their ATTORNEY

UNITED STATES PATENT OFFICE.

GARRETT W. LOW AND WILLIAM SHAKESPEARE, JR., OF KALAMAZOO, MICHIGAN.

PHOTOGRAPHIC SHUTTER.

SPECIFICATION forming part of Letters Patent No. 471,675, dated March 29, 1892.

Application filed April 29, 1891. Serial No. 390,954. (No model.)

*To all whom it may concern:*

Be it known that we, GARRETT W. LOW and WILLIAM SHAKESPEARE, Jr., citizens of the United States, and residents of Kalamazoo, in the county of Kalamazoo and State of Michigan, have jointly invented certain new and useful Improvements in Photographic Shutters, of which the following is a specification.

Our invention relates to improvements in photographic shutters, having special reference to shutters used for instantaneous work, although adapted also to shutters for time-exposures. Shutters of this class are very frequently attached to the front or rear end of the camera-tube, that being, in fact, the preferred location for them; and our invention relates to an exceedingly simple and effective device whereby the shutter may be quickly and accurately attached to either end of the camera-tube and clamped upon it in an exactly central position, so that no care or expense is necessary on the part of the user, and the shutter may be in a moment disengaged from the camera-tube and used upon another camera, if desired.

Our intention is to make and sell these articles—*i. e.*, our improved attaching device—as an article of manufacture by themselves, so that they can be sold to makers of shutters, and also to attach them to shutters to be sold as part thereof.

Figure 1:
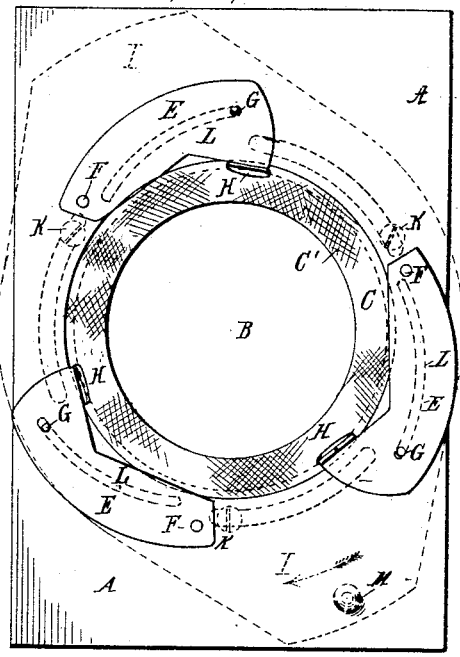
Figure 2:
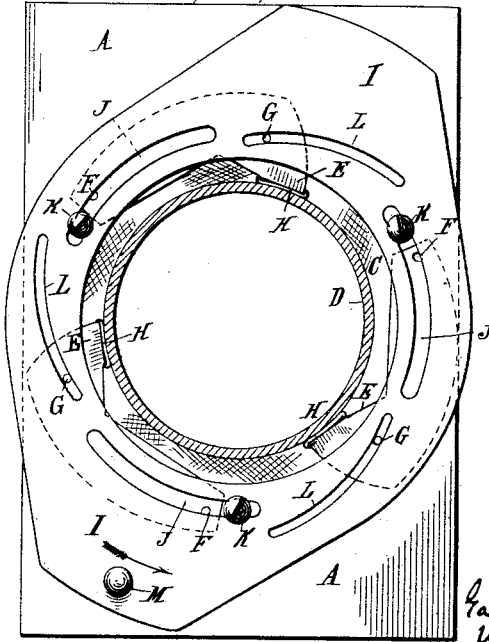

In the drawings, Figure 1 illustrates an elevation of the back board of a photographic shutter, showing our devices attached thereto, the plate which we call the "cam-slot plate" being indicated in dotted lines. Fig. 2 shows an elevation of the invention from the reverse side to that shown in Fig. 1, the cam-slot plate being shown in full lines and the underlying pivoted clamps shown in dotted lines, or rather so much of them as underlies the cam-slot plate. Fig. 3 shows a vertical section illustrating the devices attached to a lens-tube.

A is the back board of the shutter. B is the opening therein, and C is a ledge or annular rabbet made in the back board, into which the end of the lens-tube passes and against which its front edge rests.

D is the lens-tube shown in section in Fig. 2.

E E E are three clamps. They are pivoted to the base-board at F, and are each provided with an outwardly-projecting pin G near one end.

H is the clamping-face of these pivoted clamps, which we prefer to cover with rubber, leather, or equivalent material, although that is not absolutely essential. The hold of the clamping device upon the lens-tube is a little more perfect, however, if it be present.

I (see Fig. 2) is the cam-slotted plate above referred to. It has concentric slots J, through which pass screws or headed pins K, by means of which the plate is held to the back board A, and by which it is guided during its partial rotary movement, so that it revolves about the axis of the lens.

L L L are other slots cut in the plate I, one end of each of them being nearer the axis of the plate than the other end. Consequently these last-named slots L are in operation cam-slots, and in them the pins G work. They project through these slots and preferably somewhat beyond the outside of the plate I.

M is a handle, which is convenient for the purpose of rotating the cam-slot plate. Any other equivalent means may, however, be employed. The surface of the ledge C in the back plate is covered with felt or equivalent light-excluding material C', against which the edge of the lens-tube will be pressed, thus completely excluding the light.

The operation is as follows: When the parts are in position, as shown in Fig. 1, the pins G are at the outermost end of the slots L in the cam-plate, and consequently the clamps H are withdrawn or expanded. The device is while in this position clapped upon the end of the lens-tube, and then the plate is swung in the direction of the arrow in Fig. 1 into the position shown in Fig. 2. This movement causes the plate I to partially rotate upon its axis, being guided by the pins K in the slots J, and the cam-slots L, acting upon the pins G, close in the clamps E until the clamping-surfaces H impinge upon and grasp the lens-tube. Thus the device is centered and firmly held to the lens-tube, and light is excluded by reason of the pad C'; also, of course, by the shutter, which is upon the front face of the back board A, and is not shown. It may be of any preferred construction. The pitch of the cam-slots L in the plate I is such that the clamps will be held or locked by the plate in whatsoever position they may be left. In other words, pressure upon the clamps will not serve to rotate the plate.

We claim—

1. The combination, in a photographic shutter, of a back board, a plurality of pivoted clamps having pins near their free ends, and a plate attached to the back board, having concentric slots and pins for its guidance, and also eccentric slots in which the pins upon the clamps move, substantially as set forth.

2. The combination, in a photographic shutter, of a back board, a plurality of pivoted clamps having pins near their free ends, a plate attached to the back board, having concentric slots and pins for its guidance, and eccentric slots in which the pins upon the clamps move, and a light-excluding pad, substantially as set forth.

3. As a new article of manufacture, a clamping device for photographic shutters, comprising, essentially, a plate having a hole in the center and slots concentric therewith, other slots eccentric thereto, and clamps having pins adapted to work in the eccentric slots, substantially as set forth.

Signed at Kalamazoo, in the county of Kalamazoo and State of Michigan, this 25th day of April, A. D. 1891.

GARRETT W. LOW.
WILLIAM SHAKESPEARE, JR.

Witnesses:
WALLACE F. W. STAFFORD,
WILLIAM SHAKESPEARE.